L. W. Turner.
Broom Holder.
No 90,411.        Patented May 25, 1869.
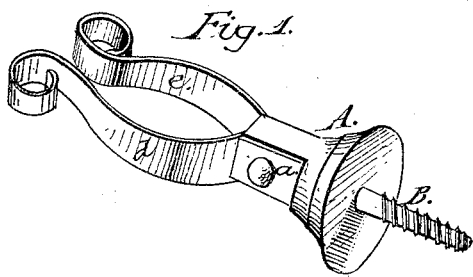
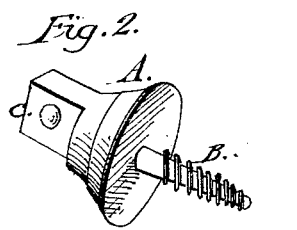 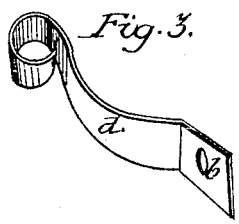
Witnesses:
Charles Leombra
R. Fitzgerald
Inventor:
Lewis W. Turner

United States Patent Office.

LEWIS W. TURNER, OF YALESVILLE, CONNECTICUT.

Letters Patent No. 90,411, dated May 25, 1869.

IMPROVED BROOM-HOLDER.

The Schedule referred to in these Letters Patent and making part of the same.

*To all whom it may concern:*

Be it known that I, LEWIS W. TURNER, of Yalesville, in the county of New Haven, and State of Connecticut, have invented a new and useful Improvement in Broom-Holders, as a new article of manufacture; and I do hereby declare that the following is a full, clear, and exact description of the construction, character, and operation of the same, reference being had to the accompanying drawings, which make part of this specification, in which—

Figure 1 is a perspective view of the article complete, ready to be secured to the wall or casing.

Figure 2 is a perspective view of the body-part, showing screw, &c.

Figure 3 is a perspective view of one of the springs.

My improvement consists in casting the body-part on to the head, or shank of a common "wood-screw," and in attaching two curved springs to the opposite sides of the projecting portion of the body-part, in such a manner that I can turn the screw into the wall, or casing, in any position, and have the two springs project in such a manner that the handle of the broom may be slipped between them with perfect convenience.

I make the body-part of cast-iron, or any other suitable material, as indicated at A, fig. 1, by casting it on to the head, or shank of a common "wood-screw," or a screw of any other thread suited to the wall, or casing, substantially as indicated at B, fig. 2, and the whole as indicated or represented in fig. 1.

I make the clasping-part, or that part which is to receive the broom-handle and sustain the broom, of two parts, (one of which is shown in fig. 3,) of steel, suitably tempered, or of any other suitably elastic material.

I attach the two springs, $d\ e$, which constitute the clamp, to the body, or cast part A by a suitable rivet, as indicated at $a$, fig. 1, passing through the holes, as represented at $b$, fig. 3, and $c$, fig. 2, so as to secure the parts firmly to each other.

To use this broom-holder, I turn the screw B into the wall, or casing, so as to bring the spring-hasps $d$ and $e$, fig. 1, into a horizontal position, as represented in fig. 1, when it will be ready for use.

This holder, of course, is equally suitable for whips and other analogous articles.

The advantages of my improvement consist in the slight expense of the manufacture, and the simplicity of putting it up for use, as it is all in one piece.

What I claim as my invention, and desire to secure by Letters Patent, as a new article of manufacture, is—

The holder, composed of the body A, screw B, and spring-clamps or clasps $d$ and $e$, when the whole is constructed, attached, and fitted for use, substantially as herein described and set forth.

LEWIS W. TURNER.

Witnesses:
 CHARLES LOMBRA.
 R. FITZGERALD.